US012043449B2

(12) United States Patent
Holowaychuk et al.

(10) Patent No.: US 12,043,449 B2
(45) Date of Patent: Jul. 23, 2024

(54) DUAL HANDLE LID FOR A LIQUID CONTAINER

(71) Applicant: 1535674 ALBERTA INC., Leduc (CA)

(72) Inventors: Mark Holowaychuk, Leduc (CA); Darren Thompson, Leduc (CA); Andrew Canham, Leduc (CA)

(73) Assignee: 1535674 ALBERTA INC., Leduc (CA)

( * ) Notice: Subject to any disclaimer, the term of this patent is extended or adjusted under 35 U.S.C. 154(b) by 42 days.

(21) Appl. No.: 18/105,726

(22) Filed: Feb. 3, 2023

(65) Prior Publication Data

US 2023/0249878 A1 Aug. 10, 2023

Related U.S. Application Data

(60) Provisional application No. 63/306,828, filed on Feb. 4, 2022.

(51) Int. Cl.

| | |
|---|---|
| ***B65D 25/28*** | (2006.01) |
| ***B01F 31/441*** | (2022.01) |
| ***B01F 101/14*** | (2022.01) |
| ***B65D 25/02*** | (2006.01) |
| ***B65D 43/02*** | (2006.01) |

(52) U.S. Cl.
CPC ........ *B65D 25/2867* (2013.01); *B01F 31/441* (2022.01); *B65D 25/02* (2013.01); *B65D 25/2882* (2013.01); *B65D 43/0229* (2013.01); *B01F 2101/14* (2022.01)

(58) Field of Classification Search
CPC .... B01F 31/441; B01F 2101/14; B65D 25/02; B65D 25/28; B65D 25/2867; B65D 25/2882; B65D 43/02; B65D 43/0229; B65D 47/06; B65D 47/08; B65D 47/32; B65D 51/18
USPC .................. 206/219; 220/212.5, 710.5, 758, 220/762–765
See application file for complete search history.

(56) References Cited

U.S. PATENT DOCUMENTS

| | | | | |
|---|---|---|---|---|
| 5,244,113 A * | 9/1993 | Stymiest | B65D 47/0885 | 220/212.5 |
| 8,695,830 B2 * | 4/2014 | Meyers | B65D 47/0895 | D9/449 |
| 9,790,007 B2 * | 10/2017 | Sorensen | B65D 47/065 | |
| 10,512,347 B1 * | 12/2019 | Shepard | B65D 47/066 | |
| 2012/0031902 A1 * | 2/2012 | Gilbert | B65D 39/08 | 220/212.5 |
| 2013/0153587 A1 * | 6/2013 | Speh | A47J 31/44 | 220/212.5 |
| 2021/0130051 A1 * | 5/2021 | Meyers | B65D 43/0229 | |

* cited by examiner

*Primary Examiner* — Bryon P Gehman
(74) *Attorney, Agent, or Firm* — Nathan V. Woodruff

(57) ABSTRACT

A lid for a liquid container has a lid body having an outer perimeter in a horizontal plane. The lid body defines a liquid port within the outer perimeter. The lid body has a closure that selectively closes the liquid port. A rigid handle extends away from the lid body, the rigid handle defining a first aperture adjacent to the lid body. A pivoting handle is attached to the lid body by a pivot connection. The pivoting handle defines a second aperture and is pivotable from a stored position, in which the first aperture and the second aperture cooperate to define a common aperture, to a second position in which the first aperture is pivotally spaced from the second aperture.

20 Claims, 4 Drawing Sheets

DUAL HANDLE LID FOR A LIQUID CONTAINER

TECHNICAL FIELD

This relates to lids for liquid containers, and in particular lids with pivoting handles.

BACKGROUND

Portable liquid containers are commonly used by individuals in a variety of circumstances and are preferably designed to make it convenient to transport and consume fluids without spilling. Containers may have carrying handles and spouts with sealable closures to prevent spilling. U.S. Pat. No. 10,028,603 (Sorensen et al.) entitled "Closure for an opening in a lid" is an example of a lid for a liquid container with a fixed handle.

SUMMARY

According to an aspect, there is provided a lid for a liquid container, comprising a lid body having an outer perimeter in a horizontal plane, the lid body defining a liquid port within the outer perimeter, the lid body having a closure that selectively closes the liquid port. A rigid handle extends away from the lid body, the rigid handle defining a first aperture adjacent to the lid body. A pivoting handle is attached to the lid body by a pivot connection, the pivoting handle defining a second aperture, the pivoting handle being pivotable from a stored position, in which the first aperture and the second aperture cooperate to define a common aperture, to a second position in which the first aperture is pivotally spaced from the second aperture.

According to other aspects, the lid may comprise one or more of the following features, alone or in combination: in the stored position, the pivoting handle may nest within the rigid handle; in the stored position, an outer surface of the pivoting handle may engage an inner surface of the rigid handle; the pivoting handle may be secured in the stored position by a releasable catch, which may comprise a detent; the closure may comprise a cover that releasably engages the liquid port, the cover may be pivotable about a closure pivot between a closed position and an open position, and the pivoting handle may comprise a profile that receives the closure pivot; the lid body may comprise a holder for a guide rod on a bottom surface; and the rigid handle may be substantially coplanar with the horizontal plane.

According to an aspect, there is provided a liquid container comprising a container body having an open top, and a lid as defined above, and configured to engage and cover the open top.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

Figure 1:
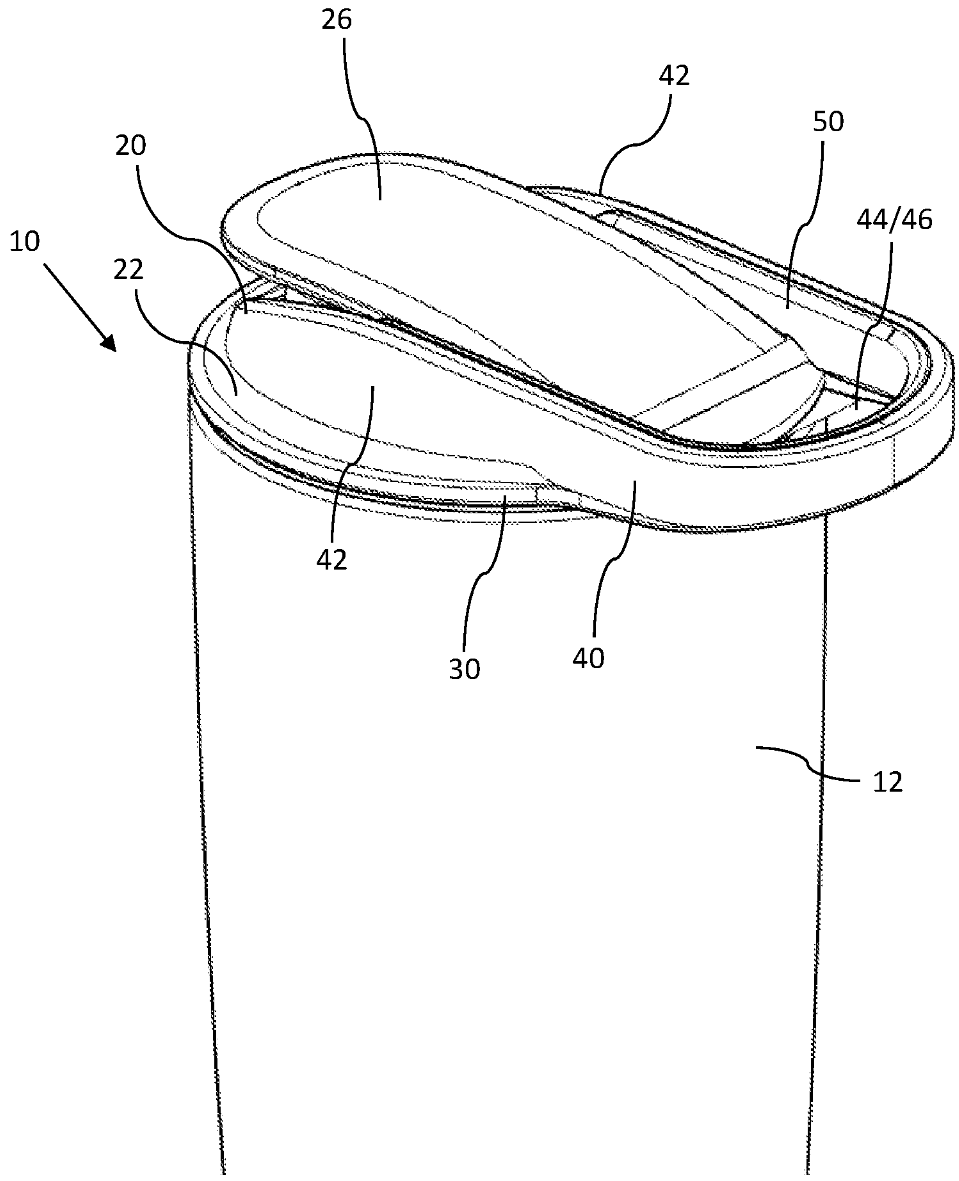
FIG. 1 is a perspective view of a liquid container and lid with a pivoting handle in a stored position.

A liquid container, generally identified by reference numeral 10, will now be described with reference to FIG. 1 through 5. Liquid container 10 has a container body 12 with a chamber 14 that is designed to hold liquids. Container body has an opening 15 configured to engage a lid 20, such as by a threaded connection 16 between container 12 and a lid body 22 of lid 20.

Figure 2:
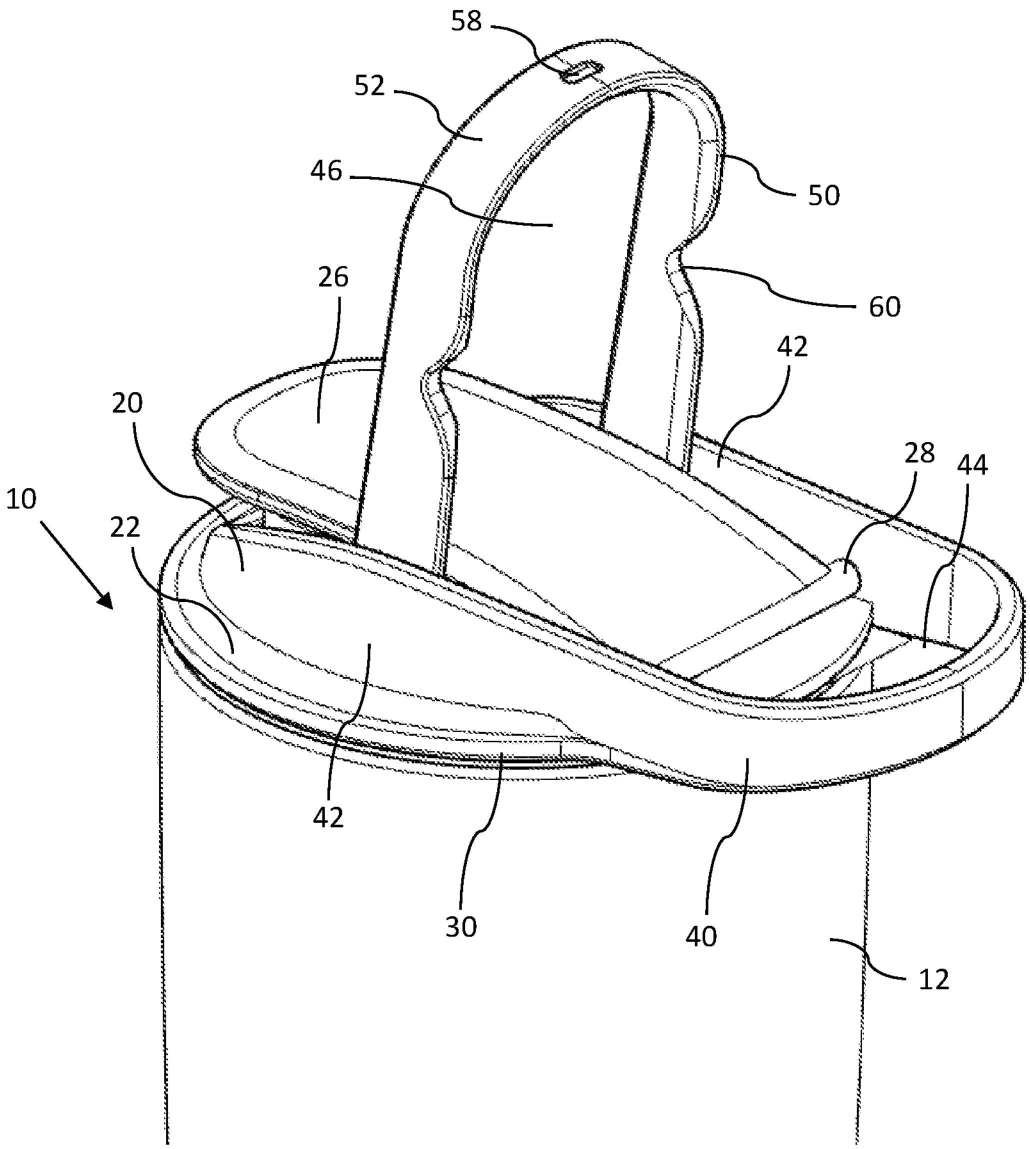
FIG. 2 is a perspective view of the liquid container of FIG. 1 with the pivoting handle in a second position.
Figure 4:
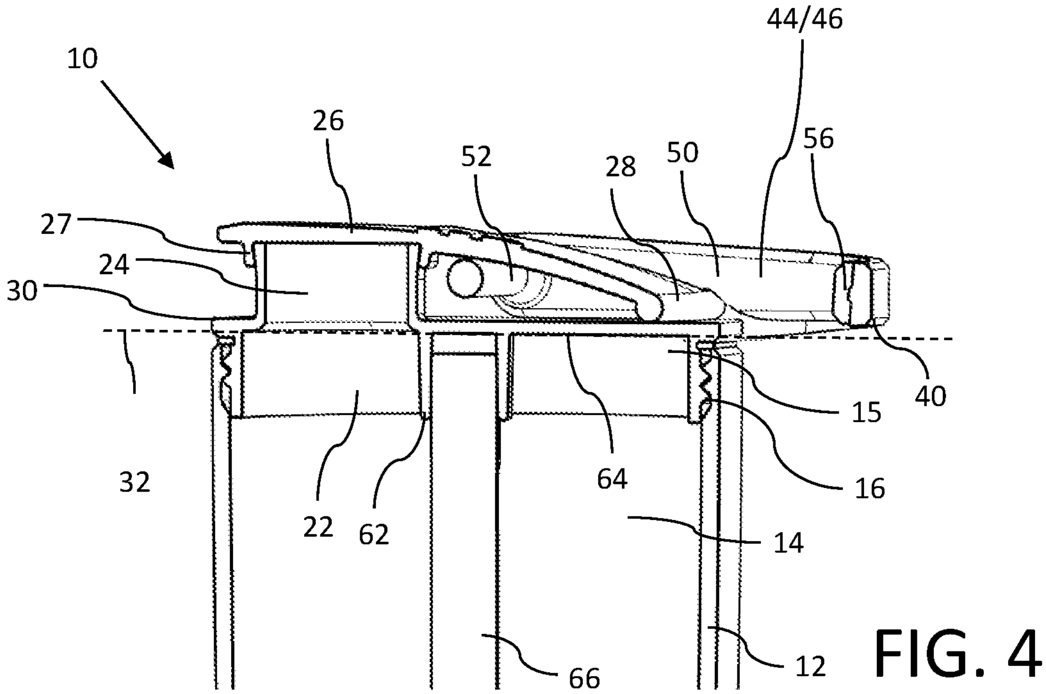
FIG. 4 is a side view in section of the liquid container of FIG. 1 with the pivoting handle in the stored position.
Figure 5:
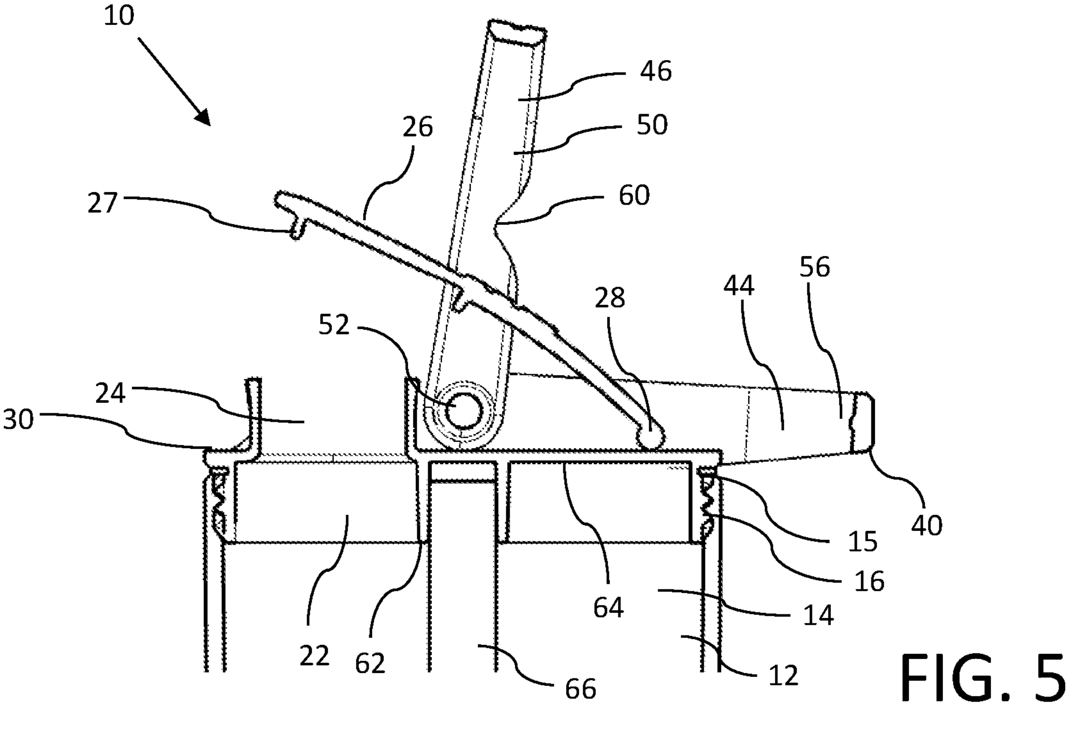
FIG. 5 is a side view in section of the liquid container of FIG. 1 with the closure pivoted toward the open position.

Referring to FIG. 1 and FIG. 2, lid 20 defines a liquid port 24, such as a spout as shown, that is selectively openable to seal or provide access to chamber 14. Liquid port 24 may be a spout through which a person can drink the liquid stored within chamber 14. Lid 20 may have a closure 26 that closes liquid port 24, such as a tab as shown, and that may be pivotable between a closed position in which liquid port 24 is sealed as shown in FIG. 4 and an open position as shown in FIG. 5. The depicted closure 26 includes a flange 27 that engages liquid port 24 in a friction or interference fit.

Relative to a horizontal plane 32 that is defined by the typical orientation of liquid container 10, lid body 22 has an outer perimeter 30 and lid 20 has a rigid handle 40 that extends away from lid body 22. Rigid handle 40 may be rigidly attached to lid body 22, such as by being integrally formed or molded with lid body 22. Rigid handle 40 may extend outward from structural ridges 42 on lid body 22 such that rigid handle 40 forms a U-shaped loop that extends past outer perimeter 30 of lid body 22 to define a first aperture 44 between rigid handle 40 and lid body 22. Rigid handle 40 may be substantially parallel or coplanar to horizontal plane 32. Rigid handle 40 may have an inner surface 48 that extends in a direction perpendicular to horizontal plane 32. Inner surface 48 may be a continuous surface that extends along an inner periphery of rigid handle 40 and structural ridges 42.

Lid 20 has a pivoting handle 50 attached to lid 20 at a pivot connection 52 on lid body 22. Pivoting handle 50 is pivotable between a stored position shown in FIG. 1 and FIG. 4, and a second position shown in FIG. 2 and FIG. 3. In the second position, pivoting handle 50 may move toward a position that is substantially perpendicular to horizontal plane 32. Pivoting handle 50 may be permitted to move to positions that are greater or less than perpendicular to horizontal plane 32, and may have stops (not shown) that limit the movement to a desired position. Pivoting handle 50 defines a second aperture 46. When in the stored position, first aperture 44 and second aperture 46 cooperate to define a common aperture. When in the second position, first aperture 44 is spaced apart from second aperture 46.

Figure 3:
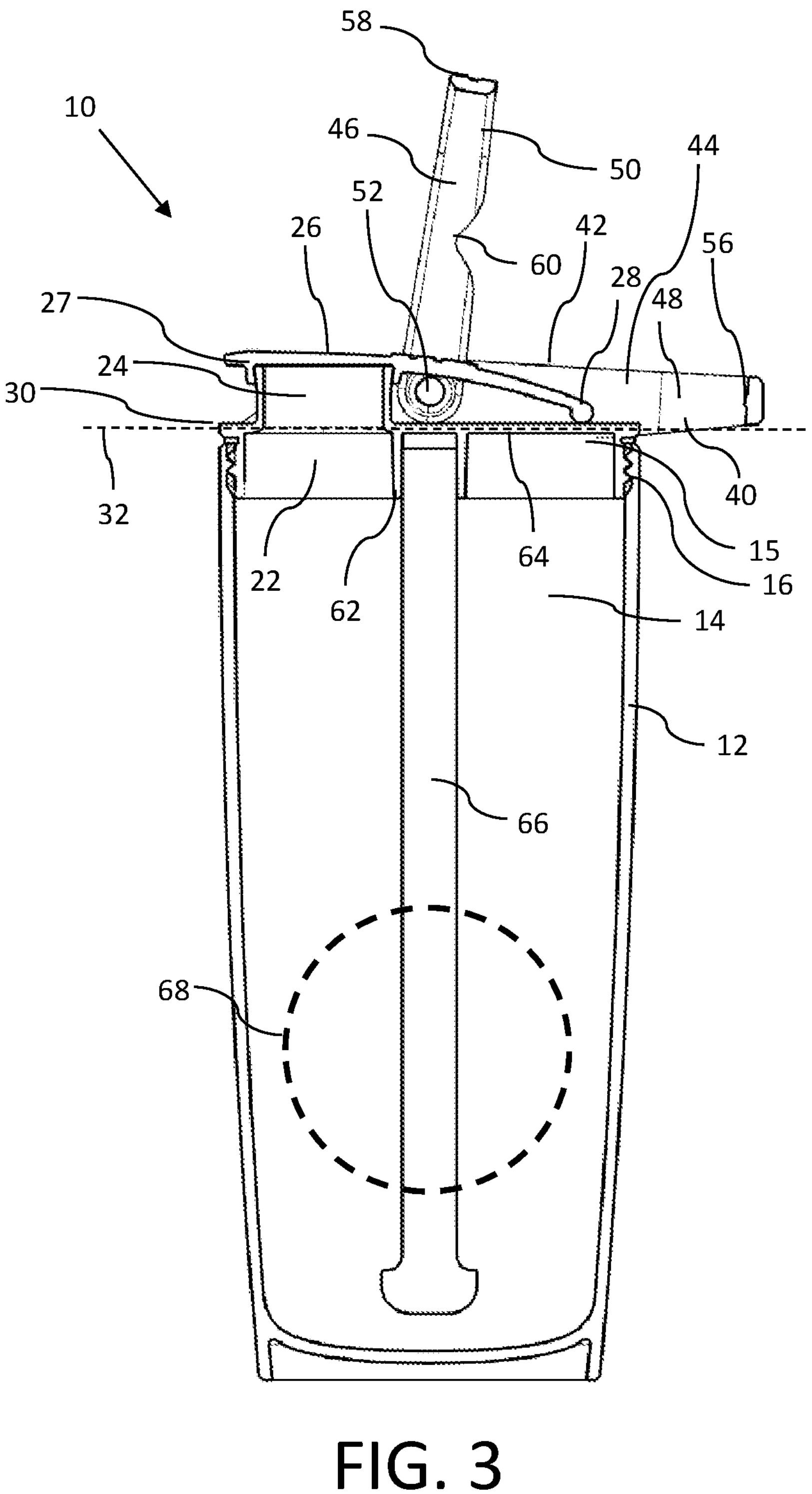
FIG. 3 is a side view in section of the liquid container of FIG. 1 with the pivoting handle in the second position.

Referring to FIG. 3, in the stored position, pivoting handle 50 may be nested within rigid handle 40, and positioned substantially parallel to or coplanar with horizontal plane 32. Referring to FIGS. 1 and 2, pivoting handle 50 may have an outer surface 54 that substantially corresponds to inner surface 48 of rigid handle 40, and rests within inner surface 48 when in the stored position. Outer surface 54 of pivoting handle 50 may fit closely, and may engage, inner surface 48 of rigid handle 40. Referring to FIGS. 3 and 4, pivoting handle 50 may be releasably secured in the nested position such as by using a close-fitting fit between pivoting handle 50 and rigid handle 40, or a detent between pivoting handle 50 and rigid handle 40 as shown. As shown the engagement includes a protrusion 56 on inner surface 48 that engages a corresponding recess 58 on outer surface 54 when in the nested position. Other types of engagement may include a releasable latch, magnetic elements, and the like. Pivoting handle 50 may be free to pivot about pivot connection 52 when the detent 56/58 is disengaged. In some examples, pivoting handle 50 may also releasably lock into the extended position.

Pivot connection 52 may be two connections located adjacent to inner surface 48 on structural ridges 42. Closure 26 may also have closure pivot connection 28 located adjacent to inner surface 48 on structural ridges 42. As such, pivoting handle 50 may have a profile 60 that receives closure pivot connection 28 to prevent interference as pivoting handle moves to the stored position.

Referring to FIG. 3, lid 20 may have a guide receptacle 62 on a bottom surface 64 of lid 20. Receptacle 62 is configured to secure a guide rod 66 in place that extends into chamber 14 when lid 20 is fixed to container body 12. Guide rod 66 is intended to slidably contain a mixing element 68 that slides along guide rod 66 when a user shakes liquid container 10 to mix the contents.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings but should be given the broadest interpretation consistent with the description as a whole.

What is claimed is:

1. A lid for a liquid container, comprising:

a lid body having an outer perimeter in a horizontal plane, the lid body defining a liquid port within the outer perimeter, the lid body having a closure that selectively closes the liquid port;

a rigid handle that extends away from the lid body, the rigid handle defining a first aperture adjacent to the lid body; and a pivoting handle attached to the lid body by a pivot connection, the pivoting handle defining a second aperture, the pivoting handle being pivotable from a stored position, in which the first aperture and the second aperture cooperate to define a common aperture, to a second position in which the first aperture is pivotally spaced from the second aperture.

2. The lid of claim 1, wherein, in the stored position, the pivoting handle is nested within the rigid handle.

3. The lid of claim 2, wherein, in the stored position, an outer surface of the pivoting handle engages an inner surface of the rigid handle.

4. The lid of claim 1, wherein the pivoting handle is secured in the stored position by a releasable catch.

5. The lid of claim 4, wherein the releasable catch comprises a detent.

6. The lid of claim 1, wherein the closure comprises a cover that releasably engages the liquid port.

7. The lid of claim 6, wherein the cover is pivotable about a closure pivot between a closed position and an open position.

8. The lid of claim 7, wherein the pivoting handle comprises a profile that receives the closure pivot.

9. The lid of claim 1, wherein the lid body comprises a bottom surface, the bottom surface having a holder for a guide rod.

10. The lid of claim 1, wherein the rigid handle is substantially coplanar with the horizontal plane.

11. A liquid container comprising:

a container body having an open top; and a lid configured to engage and cover the open top, the lid comprising:

a lid body having an outer perimeter in a horizontal plane, the lid body defining a liquid port within the outer perimeter, the lid body having a closure that selectively closes the liquid port;

a rigid handle that extends away from the lid body, the rigid handle defining a first aperture adjacent to the lid body; and a pivoting handle attached to the lid body by a pivot connection, the pivoting handle defining a second aperture, the pivoting handle being pivotable from a stored position, in which the first aperture and the second aperture cooperate to define a common aperture, to a second position in which the first aperture is pivotally spaced from the second aperture.

12. The liquid container of claim 11, further comprising a guide rod extending into the container body, the guide rod being secured in a receptacle of a bottom surface of the lid body.

13. The liquid container of claim 12, wherein the guide rod comprises a mixing element configured to slide along a length of the guide rod.

14. The liquid container of claim 11, wherein, in the stored position, the pivoting handle is nested within the rigid handle.

15. The liquid container of claim 14, wherein, in the stored position, an outer surface of the pivoting handle engages an inner surface of the rigid handle.

16. The liquid container of claim 14, wherein the pivoting handle is secured in the stored position by a detent.

17. The liquid container of claim 11, wherein the closure comprises a cover that releasably engages the liquid port.

18. The liquid container of claim 17, wherein the cover is pivotable about a closure pivot between a closed position and an open position.

19. The liquid container of claim 17, wherein the pivoting handle comprises a profile that receives the closure pivot.

20. The liquid container of claim 11, wherein the rigid handle is substantially coplanar with the horizontal plane.

* * * * *